United States Patent [19]

Williams, III et al.

[11] 3,983,093

[45] Sept. 28, 1976

[54] NOVEL POLYETHERIMIDES

[75] Inventors: Frank J. Williams, III, Scotia; Paul E. Donahue, Schenectady, both of N.Y.

[73] Assignee: General Electric Company, Schenectady, N.Y.

[22] Filed: May 19, 1975

[21] Appl. No.: 578,601

[52] U.S. Cl.................... 260/47 CP; 260/37 N; 260/46.5 E; 260/49; 260/50; 428/435; 428/443; 428/458; 428/474
[51] Int. Cl.²......................................... C08G 73/10
[58] Field of Search............ 260/47 CP, 46.5 E, 49, 260/65, 78 TF, 50

[56] References Cited
UNITED STATES PATENTS

| | | | |
|---|---|---|---|
| 3,699,075 | 10/1972 | Lubowitz | 260/49 |
| 3,803,085 | 4/1974 | Takekoshi et al. | 260/46.5 E |
| 3,833,546 | 9/1974 | Takekoshi et al. | 260/47 CP |
| 3,847,867 | 11/1974 | Heath et al. | 260/47 CP |
| 3,850,885 | 11/1974 | Takekoshi et al. | 260/47 CZ |
| 3,875,116 | 4/1975 | Heath et al. | 260/47 CP |

*Primary Examiner*—Lester L. Lee
*Attorney, Agent, or Firm*—F. Wesley Turner; Joseph T. Cohen; Jerome C. Squillaro

[57] ABSTRACT

This invention is concerned with a new class of polyetherimides. More particularly, the invention is concerned with polyetherimides derived from the reaction of an organic diamine, a bisphenol dianhydride and a dianhydride selected from the class consisting of pyromellitic dianhydride, a sulfur dianhydride, and a benzophenone dianhydride. The polyetherimide compositions have improved solvent resistance which enhances their value in a wide variety of uses including films, molding compounds, coatings, etc.

12 Claims, No Drawings

NOVEL POLYETHERIMIDES

This invention is concerned with a new class of polyetherimides. More particularly, the invention is concerned with polyetherimides derived from the reaction of an organic diamine, a bisphenol dianhydride and a dianhydride selected from the class consisting of pyromellitic dianhydride, sulfur dianhydride, and benzophenone dianhydride.

The predominant proportion of the polyetherimide principal polymer chain comprises structural units of the empirical formula:

I.   

where the mole fraction $m$ stands for a number greater than 0 and smaller than 1, preferably a number at least greater than about 0.25, more preferably greater than about 0.50, and even more preferably greater than about 0.75.

The A units comprise the formula:

II.   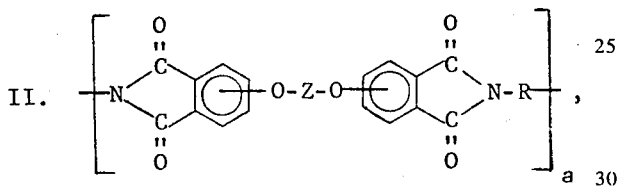

where —O—Z—O— may be in the 3 or 3'- and 4 or 4'-positions and Z is a member of the class consisting of
(1)

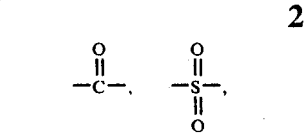

—O— and —S—, where $q$ is 0 or 1, $y$ is a whole number from 1 to 5, the divalent bonds of the —O—Z—O— radical are situated on the phthalic anhydride end groups, e.g., in the 3,3'-, 3,4'-, 4,3'- or the 4,4'-positions, and R is a divalent organic radical selected from the class consisting of (a) aromatic hydrocarbon radicals having from 6–20 carbon atoms and halogenated derivatives thereof, (b) alkylene radicals and cycloalkylene radicals having from 2–20 carbon atoms, $C_{(2-8)}$ alkylene terminated polydiorganosiloxane, and (c) divalent radicals included by the formula

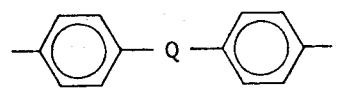

where Q is a member selected from the class consisting of —O—,

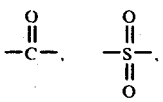

—S—, and —$C_xH_{2x}$—, and $x$ is a whole number from 1 to 5 inclusive, and the B units comprise a member of

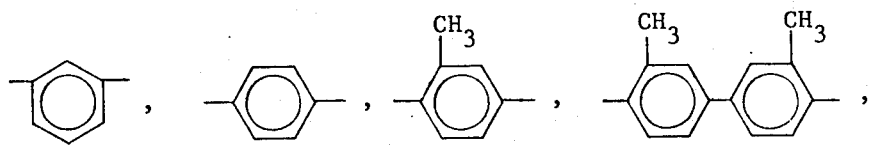

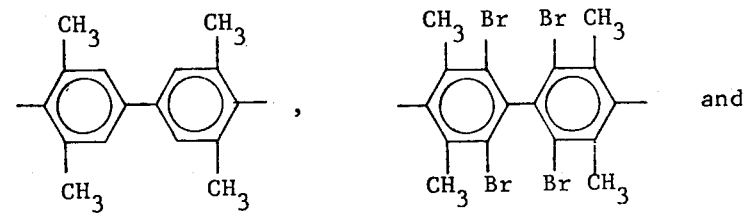

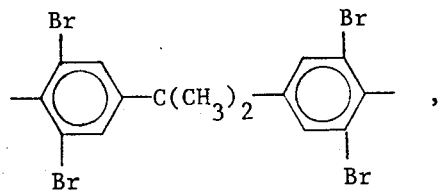

and (2) divalent organic radicals of the general formula:

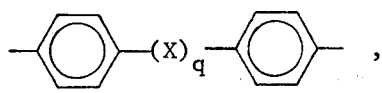

where X is a member selected from the class consisting of divalent radicals of the formulas, —$C_yH_{2y}$—, the class consisting of the formulas, III.   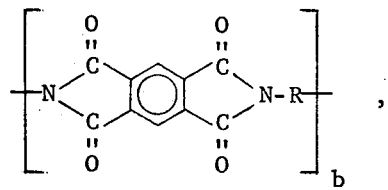

IV. 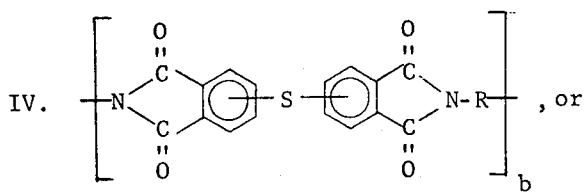, or

V. 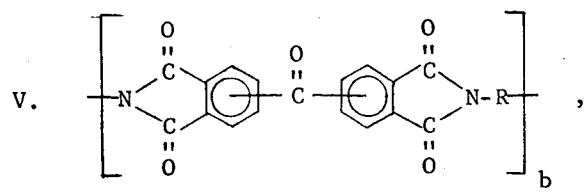, or mixtures thereof, where R is a divalent organic radical as previously defined, and independently *a* and *b* represent a whole number in excess of 1, e.g. 10 to 10,000 or more. Generally useful high molecular weight polyetherimides, hereafter sometimes referred to as PEI, of Formula II have an intrinsic viscosity [$\eta$] greater than 0.2 dl./gm., preferably in the 0.4 to 0.7 dl./gm. range or even higher, in m-cresol at 25° C. The polyetherimide A units of Formula II and the polyimide B units of Formulas III through V are combinable with each other in all proportions. Consequently, PEI compositions comprising from 1 to 99% A units, by weight, and from 99 to 1% B units, by weight, are included within the scope of the invention. By controlling the proportions of PEI-A units and PI-B units solvent resistant polyetherimides of Formula I can be prepared having predetermined properties which are improved over those of polyetherimides of Formula II free of polyimide units of Formulas III through V. In general, the above-described polyetherimides can be made directly from the reaction of dianhydrides, for example, the dianhydride of formula VI. 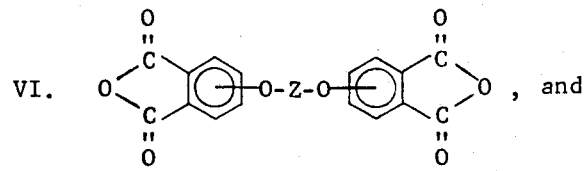, and pyromellitic dianhydride of formula VII. 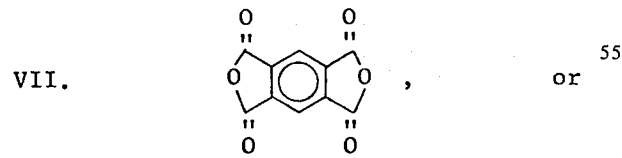, or or sulfur dianhydride of formula VIII. 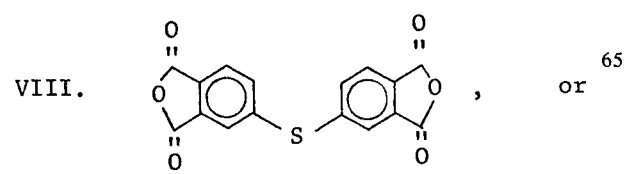, or or benzophenone dianhydride of formula IX. 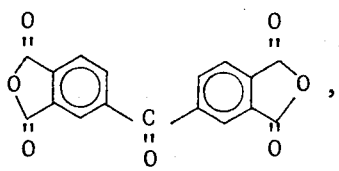, or mixtures thereof. Further, illustratively, the 4,4'-substituted dianhydrides of Formulas VII, IX and X can be replaced by their corresponding 3,3'-, 3,3'-, 4',3-substituted dianhyride alternatives. Methods for the preparation of the dianhydrides of Formulas VII and IX above, respectively, are disclosed in U.S. Pat. No. 3,847,867 and U.S. copending application Ser. No. 346,470, filed Mar. 30, 1973, all assigned to the assignee of this invention. The dianhydrides of Formulas VIII and X are readily available from commercial sources.

The polyetherimides of Formula I can be obtained by reacting any dianhydride of Formula VI, and pyromellitic dianhydride of Formula VII, a sulfur dianhydride of Formula VIII, a benzophenone dianhydride of Formula IX or mixtures thereof with a diamino compound of the formula

X. $H_2N-R-NH_2$, where R is as defined hereinbefore by any method well known to those skilled in the art.

In the above diamino compound, R is a divalent organic radical selected from the class consisting of (a) aromatic hydrocarbon radicals having from 6 to 20 carbon atoms and halogenated derivatives thereof, (b) alkylene radicals, and cycloalkylene radicals having from 2-20 carbon atoms, $C_{(2-8)}$ alkylene terminated polydiorganosiloxanes, and (c) divalent radicals included by the formula XI. 

where Q is a member selected from the class consisting of —O—,

—S—, —$C_xH_{2x}$—, and *x* is a whole number of from 1 to 5, inclusive. Included among the organic diamines of Formula X are, for example,
m-phenylenediamine,
p-phenylenediamine,
4,4'-diaminodiphenylpropane,
4,4'-diaminodiphenylmethane,
benzidine,
4,4'-diaminodiphenyl sulfide,
4,4'-diaminodiphenyl sulfone,
4,4'-diaminodiphenyl ether,
1,5-diaminonaphthalene, 3,3'-dimethylbenzidine,
3,3'-dimethoxybenzidine,
2,4-bis($\beta$-amino-t-butyl)toluene,
bis(p-$\beta$-amino-t-butylphenyl)ether,
bis(p-$\beta$-methyl-o-aminopentyl)benzine,
1,3-diamino-4-isopropylbenzene,
1,2-bis(3-aminopropoxy)ethane,
m-xylylenediamine,
p-xylylenediamine,
2,4-diaminotoluene,
2,6-diaminotoluene,
bis(4-aminocyclohexyl)methane,
3-methylheptamethylenediamine,
4,4-dimethylheptamethylenediamine,
2,11-dodecanediamine,
2,2-dimethylpropylenediamine,
octamethylenediamine,
3-methoxyhexamethylenediamine,
2,5-dimethylhexamethylenediamine,
2,5-dimethylheptamethylenediamine,
3-methylheptamethylenediamine,
5-methylnonamethylenediamine,
1,4-cyclohexanediamine,
1,12-octadecanediamine,
bis(3-aminopropyl)sulfide,
N-methyl-bis(3-aminopropyl)amine,
hexamethylendiamine,
heptamethylenediamine,
nonamethylenediamine,
decamethylenediamine,
bis(3-aminopropyl)tetramethyldisiloxane,
bis(4-aminobutyl)tetramethyldisiloxane, etc.,
and mixtures of such diamines.

The reaction can be advantageously carried out employing well known solvents, e.g. o-dichlorobenzene, m-cresol/toluene, etc., in which to effect interaction between the dianhydrides and the diamines, at temperatures of from about 100° to about 250° C. Alternatively, the polyetherimides can be prepared by melt polymerization where the dianhydrides of Formulas VI and VII, VIII, or IX are reacted with any diamino compound of Formula X while heating the mixture of the ingredients at elevated temperatures with concurrent intermixing. Generally, melt polymerization temperatures between about 200° to 400° C. and preferably 230° to 300° C. can be employed. Any order of addition of chain stoppers ordinarily employed in melt polymerization can be employed. The conditions of the reaction and the proportions of ingredients can be varied widely depending on the desired molecular weight, intrinsic viscosity, and solvent resistance. In general, equimolar amounts of diamine and dianhydride are employed for high molecular weight polyetherimides, however, in certain instances, a slight molar excess (about 1 to 5 mol percent) of diamine can be employed resulting in the production of polyetherimides having terminal amine groups. The polyetherimides are injection moldable and can be reinforced by fillers, such as silica, carbon, fibers, glass fibers, etc., in which the filler comprises on a weight basis from 20 to 200 parts of filler per 100 parts of polymer.

The following examples illustrate but do not limit a person skilled in the art the preparation of polyetherimides according to this invention.

EXAMPLE I

The following reactants and solvents were added to a reactant vessel: 1.04 grams (0.0048 mole) pyromellitic dianhydride, 14.10 grams (0.0271 mole) 2,2-bis[4-(2,3-dicarboxyphenoxy)phenyl] propane dianhydride, hereinafter referred to as bisphenol-A dianhydride, 3.55 grams (0.0328 mole) m-phenylenediamine, 0.193 grams (0.00088 mole) of phthalic anhydride, and 63 ml. of m-cresol, and 30 ml. of toluene. The reaction mixture was heated at 170° C. for about 12 hours. The resulting viscous solution was diluted with 40 ml. of a 70:30 phenol:toluene mixture and the PEI was precipitated by adding methanol. The precipitate was dried at 125° C. to give 15.3 grams of a polyetherimide containing structuring units A abd B, respectively, of the formula

XII.

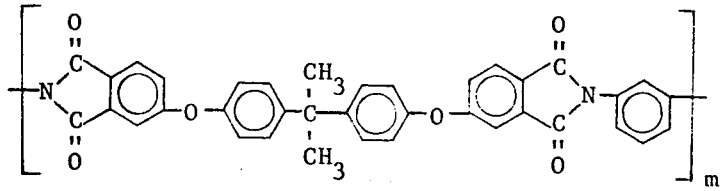

A

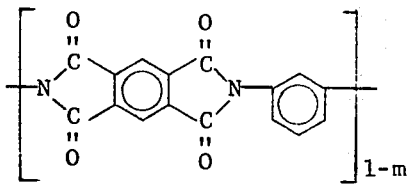

B where $m$ is a number equal to about 0.85. The polymer had an intrinsic viscosity of 0.53 dl./gm. when measured in m-cresol, and a Tg=227° C.

EXAMPLE II

A polyetherimide was prepared in accordance with the procedure of Example I, except as noted hereafter. The reactants and solvents were 2.96 grams (0.009 mole) benzophenonedianhydride, 7.04 grams (0.0135 mole) bisphenol-A dianhydride, 2.49 grams (0.0230 mole) m-phenylene diamine, 0.136 grams (0.0009 mole) of phthalic anhydride, 42.0 ml. of m-cresol, and 20 ml. of toluene. The PEI precipitate was dried at 110° C. to give 11.8 grams of a polyetherimide containing structuring units of A and B, respectively, of the formula

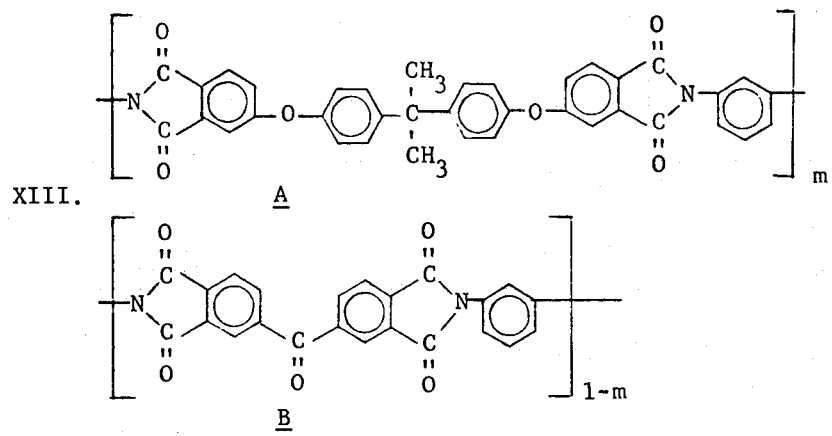

XIII.

where m is a number equal to about 0.6. The polymer had an intrinsic viscosity of 0.65 dl./gm. when measured in m-cresol, and a Tg=235° C.

EXAMPLE III

A polyetherimide was prepared in accordance with the procedure of Example I, except as noted hereafter. The reactants and solvents were 5.10 grams (0.0098 mole) bisphenol-A dianhydride, 1.08 grams (0.010 mole) metaphenylenediamine, 0.059 gram (0.0001 mole) of phthalic anhydride, 30 ml. of m-cresol and 15 ml. of toluene. The mixture was heated at 170° C. for 5 hours, cooled to room temperature, and added to a large excess of methanol to precipitate the polymer. The precipitate was dried at 120° C. to give 5.5 grams of the polyetherimide containing only structural units A of the formula

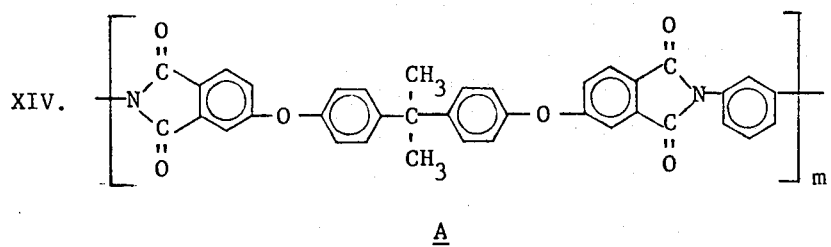

XIV.

where m is a number equal to about 1.0. The polymer had an intrinsic viscosity of 0.48 dl./gm. when measured in CHCl$_3$, and a Tg=216° C.

EXAMPLE IV

A series of tests were conducted to determine the solvent resistance of the polyetherimides of Examples I to III. The tests were conducted in accordance with the general techniques described by R. P. Kambour, E. E. Romagosa and C. L. Gruner, published in *Macromolecules*, Vol. 5, page 335 (July–August 1972) which correlates the crazing resistance of a polymer with the polymer's solubility in a given test solvent. Set out in Table I is a summary of the solvent resistance of the polyetherimides of Examples I to III in the presence of various organic solvents. A high solvent resistance number identifies a polymer having high resistance to swelling and/or plastization in the test solvent.

TABLE I

Polymer Solvent Resistance Numbers

| Run No. | Solvent | Ex. I | Ex. II | Ex. III |
|---|---|---|---|---|
| 1 | Toluene | 0.88 | 0.90 | 0.38 |
| 2 | Benzene | 0.81 | 0.89 | 0.39 |
| 3 | Acetone | 0.54 | 0.65 | 0.28 |
| 4 | Methyl Ethyl Ketone | 0.55 | 0.74 | 0.48 |
| 5 | Ethyl Acetate | 0.52 | 0.65 | 0.37 |

As illustrated by the above data, polyetherimide polymers having improved solvent resistance are obtained where a polyetherimide polymer chain contains, in addition to A structural units of Formula II (Example III), B structural units of Formulas III or V (Examples I and II, respectively).

EXAMPLE V

A polyetherimide was prepared in accordance with the procedure of Example I, except as noted hereafter. The reactants and solvents were 7.50 grams (0.0144 mole) bisphenol-A dianhydride, 1.60 grams (0.0148 mole) paraphenylenediamine, 0.0895 gram (0.0006 mole) of phthalic anhydride, 33 ml. of m-cresol and 15 ml. of toluene. The mixture was heated at 170° C. for 20 hours, cooled to room temperature, diluted with 50 ml. of chloroform, and added to methanol to precipitate the polymer. The precipitate was dried at 110° C. to give 8.7 grams of a polyetherimide containing only structural units A of the formula XV. 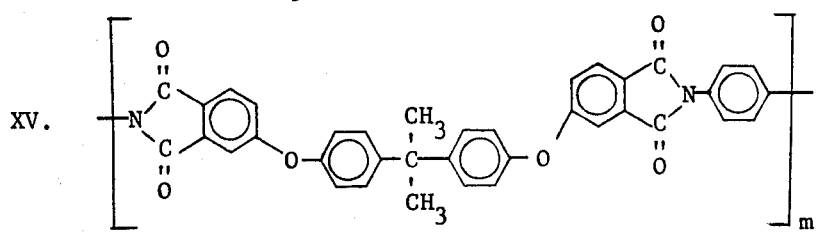

where *m* is a whole number equal to about 1.0. The polymer had a Tg=225° C. No intrinsic viscosity data was obtained due to the insolubility of the polymer in m-cresol. The resulting PEI — which contains only A structuring units of Formula II — had the following solvent resistance numbers: toluene 1.02, benzene 1.01, acetone 0.72, methyl ethyl ketone 0.73 and ethyl acetate 0.94.

Where polyetherimides contain structural units A, such as Formula XV above, as well as structuring units B, such as Formulas XVI, XVII, or XVIII, hereafter,

EXAMPLE VI

A polyetherimide was prepared in accordance with the procedure of Example 1, except as noted hereafter. The reactants and solvent were 1.02 grams (0.0031 mole) bis(2,3-dicarboxyphenyl) sulfur dianhydride, 6.50 grams (0.0125 mole) bisphenol-A dianhydride, 1.70 grams (0.0157 mole) m-phenylenediamine and 30.7 ml. of o-dichlorobenzene. The precipitate was dried at 110° C. to give 8.4 grams of a polyetherimide containing structuring units A and B, respectively, of the formula XVI. 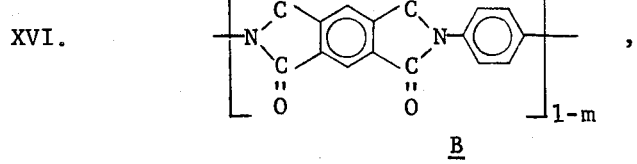

XVII. 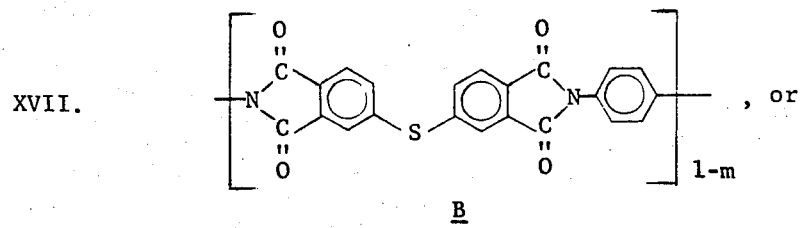, or

XVIII. 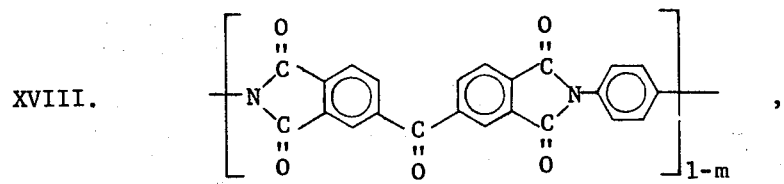, the PEI will have still higher solvent resistance numbers.

where *m* is a number equal to about 0.8. The polymer had a Tg=224° C. No intrinsic viscosity data was ob-

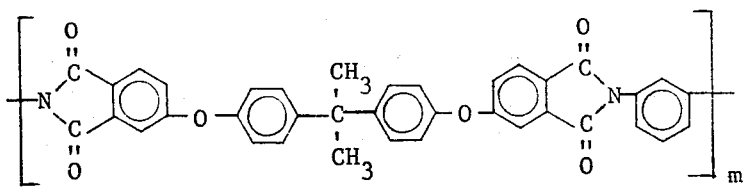

XIX.

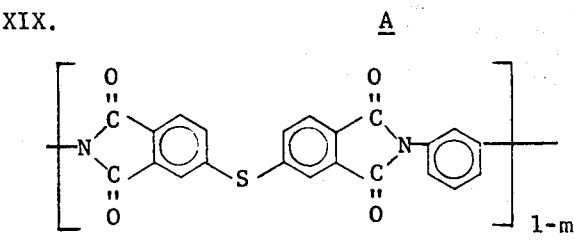

tainable due to the insolubility of the polymer in m-cresol. Polyetherimides which contain structuring units B of Formula XIX above, have the same degree of solvent resistance improvement associated with polyetherimides which contain structural units B of Formulas III and V as illustrated in Example IV.

It will, of course, be apparent to those skilled in the art that other organic diamines — in addition to the organic diamines employed in the foregoing examples — of Formula X can be employed without departing from the scope of this invention.

In addition to having the structuring units A represented by Formula II, the PEI polymers of this invention can also contain other A units, for instance, those of formulas

XX.

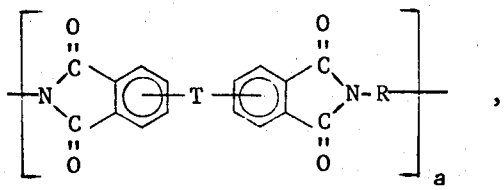

where T may be in the 3 or 3'- and 4 or 4'-positions and is a radical selected from the class consisting of (1)

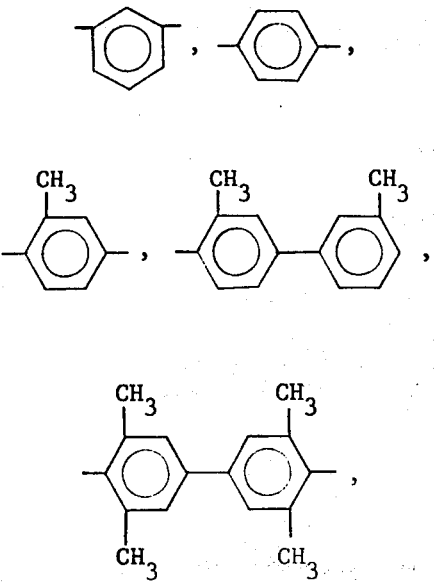

and

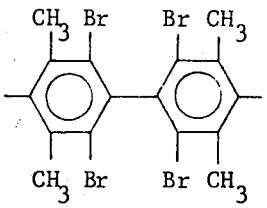

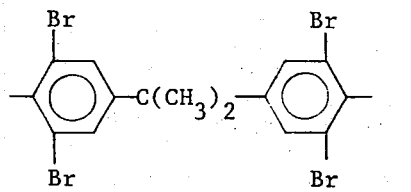

and (2) divalent organic radicals of the general formula

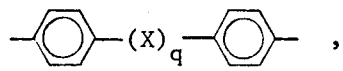

where X is a member selected from the class consisting of divalent radicals of the formulas $-C_yH_{2y}$,

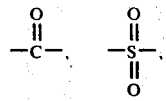

—O— and —S—, where R, $a$, $q$ and $y$ are as previously defined.

The compositions of the present invention have application in a wide variety of physical shapes and form, including the use as films, molding compounds, coatings, etc. When used as films or when made into molded products, these polymers, including laminated products prepared therefrom, not only possess good physical properties at room temperature but they retain their strength and excellent response to work-loading at elevated temperatures for long periods of time. Films formed from the polymeric compositions of this invention may be used in application where films have been used previously. Thus, the compositions of the present invention can be used in automobile and aviation applications for decorative and protective purposes, and as high temperature electrical insulation for motor slot liners, in transformers, as dielectric capacitors, as coil and cable wrappings (form wound coil insulation for motors), for containers and container linings, in laminating structures where films of the present composition or where solutions of the claimed compositions of matter are applied to various heat-resistant or other type of materials such as asbestos, mica, glass fiber and the like and superposing the sheets one upon the other and thereafter subjecting them to elevated temperatures and pressures to effect flow and cure of the resinous binder to yield cohesive laminated structures. Films made from these compositions of matter can also serve in printed circuit applications.

Alternatively, solutions of the compositions herein described can be coated on electrical conductors such as copper, aluminum, etc., and thereafter the coated conductor can be heated at elevated temperatures to remove the solvent and to effect curing of the resinous composition thereon. If desired, an additional overcoat may be applied to such insulated conductors including the use of polymeric coatings, such as polyamides, polyesters, silicones, polyvinylformal resins, epoxy resins, polyimides, polytetrafluoro-ethylene, etc. The use of the curable compositions of the present invention as overcoats on other types of insulation is not precluded.

Applications which recommended these resins include their use as binders for asbestos fibers, carbon fibers, and other fibrous materials in making brake linings. In addition, molding compositions and molded articles may be formed from the polymeric compositions in this invention by incorporating such fillers as asbestos, glass fibers, talc, quartz, powder, wood flour, finely divided carbon, silica, into such compositions prior to molding. Shaped articles are formed under heat, or under heat and pressure in accordance with practices well known in the art. In addition, various heat-resistant pigments and dyes may be incorporated as well as various types of inhibitors depending on the application intended.

We claim:

1. A polyetherimide of the formula

[A]$_m$ [B]$_{1-m}$, where the $m$ is a number greater than 0 and smaller than 1, where A units are of the formula:

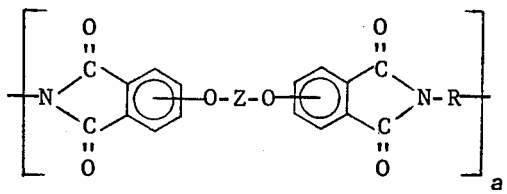

where —O—Z—O— is in the 3 or 3'- and 4 or 4'-positions and Z is a member of the class consisting of (1)

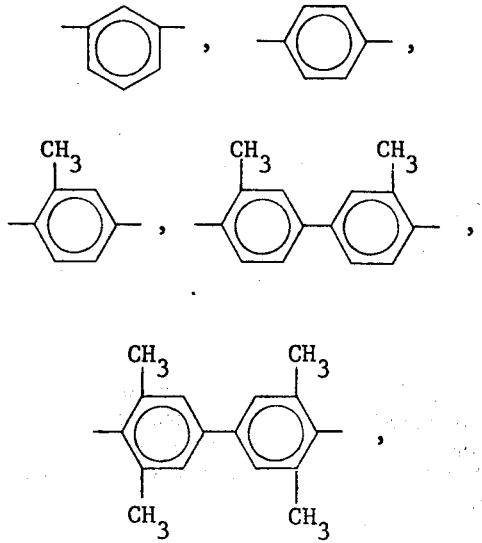

-continued

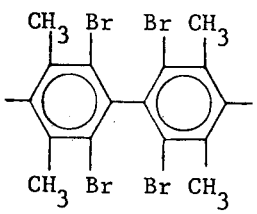 and

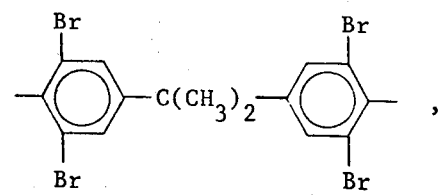, and (2) divalent organic radicals of the general formula:

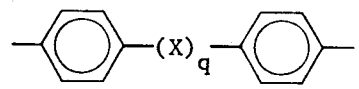

where X is a member selected from the class consisting of divalent radicals of the formulas, —C$_y$H$_{2y}$—,

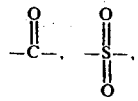

—O— and —S—, where $q$ is 0 or 1, $y$ is a whole number from 1 to 5, R is a divalent organic radical selected from the class consisting of (a) aromatic hydrocarbon radicals having from 6–20 carbon atoms and halogenated derivatives thereof, (b) alkylene radicals and cycloalkylene radicals having from 2–20 carbon atoms, C$_{(2-8)}$ alkylene terminated polydiorganosiloxane, and (c) divalent radicals included by the formula

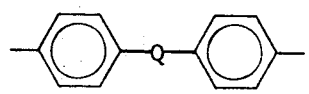

where Q is a member selected from the class consisting of —O—,

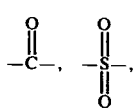

—S—, and —C$_x$H$_{2x}$—, and $x$ is a whole number from 1 to 5 inclusive, and where the B units are of the formulas:

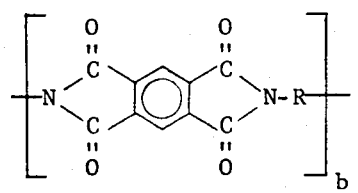

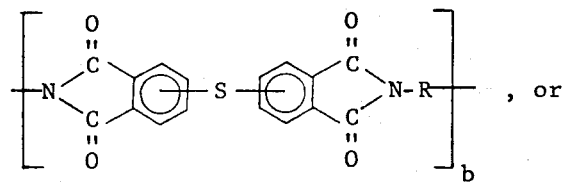, or

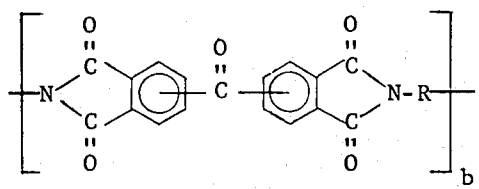, or mixtures thereof, where R is a divalent organic radical as previously defined, and independently *a* and *b* represent a whole number in excess of 1.

2. A polyetherimide of claim 1, where *m* is greater than about 0.50 and B is of the formula:

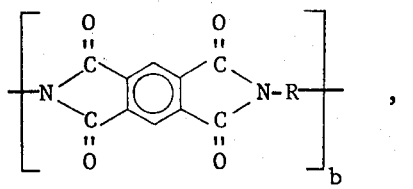, where R and *b* are as previously defined.

3. A polyetherimide of claim 1, where *m* is greater than about 0.50 and B is of the formula:

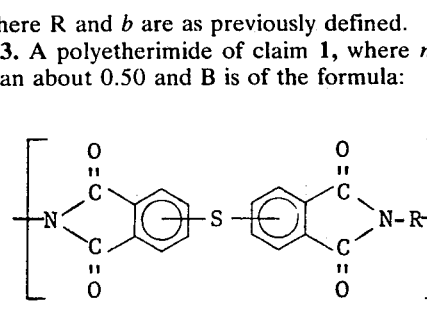, where R and *b* are as previously defined.

4. A polyetherimide of claim 1, where *m* is greater than about 0.50 and B is of the formula:

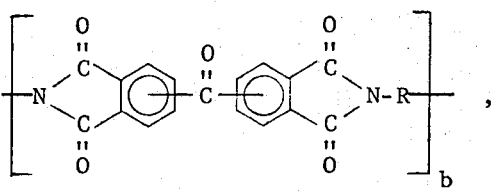, where R and *b* are as previously defined.

5. A polyetherimide of the formula $[A]_m [B]_{1-m}$, where *m* is a number greater than 0.75, where the A units are of the formula:

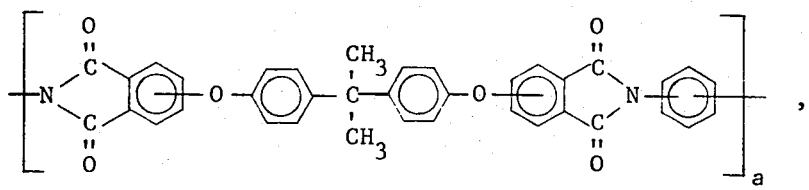, and where the units are of the formulas:

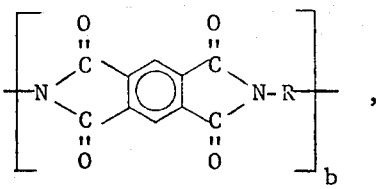,

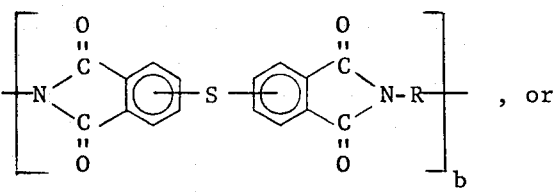, or

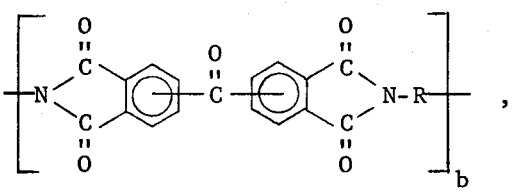, or mixtures thereof, where R is a divalent organic radical as previously defined, and independently *a* and *b* represent a whole number in excess of 1.

6. A polyetherimide of claim 5, where B is of the formula:

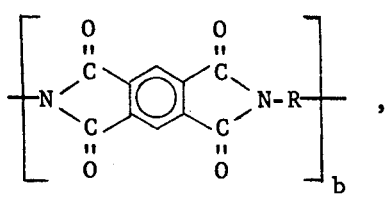

where R and b are as previously defined.

7. A polyetherimide of claim 5, where B is of the formula:

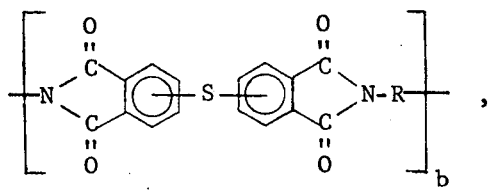

where R and b are as previously defined.

8. A polyetherimide of claim 5, where B is of the formula:

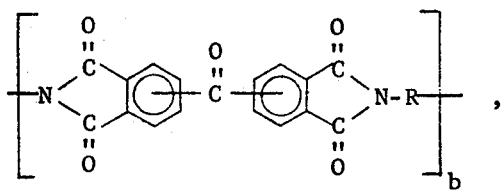

where R and b are as previously defined.

9. A polyetherimide of claim 5, where the A unit

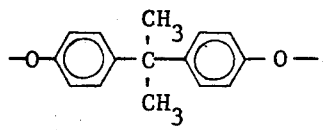

radical is situated in the 3,3'-, 3,4'-, 4,3'- and the 4,4'- positions, the ratio of 3:3' and 4:4' positions being within the range of from about 25:75 to about 75:25.

10. A polyetherimide of claim 9, where the ratio of 3:3' and 4,4' positions are within the range of from about 40:60 to about 60:40.

11. A polyetherimide of the formula $[A]_m [B]_{1-m}$ where A is the formula:

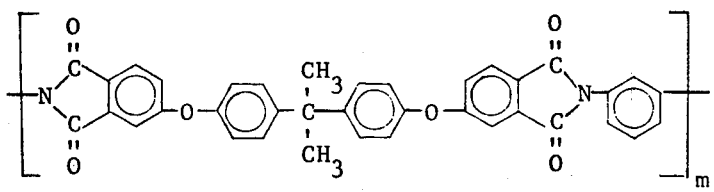

and B is the formula:

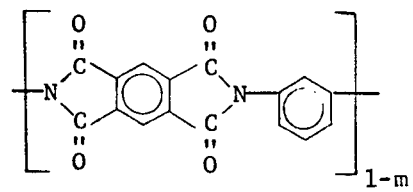

where $m$ is a number equal to at least about 0.85.

12. A polyetherimide of claim 11, where A is the formula:

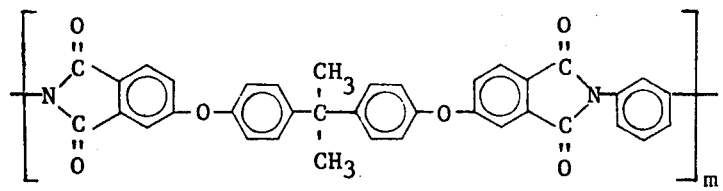

and B is the formula:

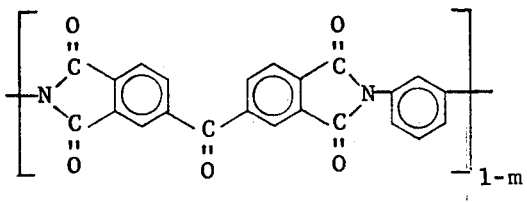

where $m$ is a number equal to at least about b 0.6.

* * * * *

UNITED STATES PATENT OFFICE
CERTIFICATE OF CORRECTION

PATENT NO. : 3,983,093
DATED : September 28, 1976
INVENTOR(S) : Frank J. Williams, III and Paul E. Donahue It is certified that error appears in the above-identified patent and that said Letters Patent are hereby corrected as shown below:

Column 4, line 13, cancel "VII, IX and X" and substitute therefor -- VI, VIII and IX --. Column 4, line 16, cancel "VII and IX" and substitute therefor -- VI and VIII --. Column 4, line 21, cancel "VIII and X" and substituted therefor -- VII and IX --. Column 10, line 19, cancel "bis(2,3-dicarboxyphenyl)" and substitute therefor -- bis(3,4-dicarboxyphenyl) --.

Signed and Sealed this

Fourth Day of January 1977

[SEAL]

Attest:

RUTH C. MASON
Attesting Officer

C. MARSHALL DANN
Commissioner of Patents and Trademarks